United States Patent [19]

Kress

[11] Patent Number: 5,308,023
[45] Date of Patent: May 3, 1994

[54] MODEL AIRCRAFT RETRACTABLE LANDING GEAR DEVICE

[75] Inventor: Robert W. Kress, Saugerties, N.Y.

[73] Assignee: Kress Jets, Inc., Saugerties, N.Y.

[21] Appl. No.: 14,760

[22] Filed: Feb. 8, 1993

[51] Int. Cl.$^5$ .............................................. B64C 25/10
[52] U.S. Cl. .................................... 244/102 R; 446/34
[58] Field of Search ......... 244/100 R, 102 R, 102 SL;
280/475, 762, 763, 764, 765, 760; 446/30, 34, 57

[56] References Cited

U.S. PATENT DOCUMENTS

| | | | |
|---|---|---|---|
| 2,882,070 | 4/1959 | Bill | 244/102 R |
| 3,752,421 | 8/1973 | Harvey et al. | 244/102 SL |
| 3,900,988 | 8/1975 | Garbello | 244/102 R |
| 4,136,891 | 1/1979 | Meuzel | 280/475 |

Primary Examiner—Galen L. Barefoot
Attorney, Agent, or Firm—Daniel Jay Tick

[57] ABSTRACT

A control member is rotatably mounted on the fuselage or on the wing of a model aircraft in spaced relation with a supporting surface of the fuselage. A gear leg is supported at one end by the control member and supports a landing wheel at its spaced opposite end. The gear leg extends radially of the control member. A torsion spring is coaxially mounted with the control member for storing energy when the control member is in a position whereby the gear leg is fully extended for ground operations and for releasing stored energy to rotate the control member in a manner whereby the gear leg is retracted for flying operations. A gear retracting initiator coupled to the torsion spring initiates gear retraction. An extend lock locks the gear leg in its fully extended position. A retract lock locks the gear leg in its retracted position. An actuator in operative proximity with the extend lock and the retract lock assists in locking the gear leg in its fully extended position and assists in locking the gear leg in its retracted position.

10 Claims, 3 Drawing Sheets

MODEL AIRCRAFT RETRACTABLE LANDING GEAR DEVICE

BACKGROUND OF THE INVENTION

The present invention relates to a model aircraft retractable landing gear device. More particularly, the invention relates to a retractable landing gear device for a flying model aircraft.

The retractable landing gear mechanisms of flying model aircraft are generally quite heavy, very bulky and expensive in manufacture. These mechanisms thus make the model aircraft more costly to purchase and to operate.

The principal object of the invention is to provide a model aircraft retractable landing gear device of simple structure.

An object of the invention is to provide a model aircraft retractable landing gear device which is light in weight.

Another object of the invention is to provide a model aircraft retractable landing gear device of simple structure which is inexpensive in manufacture.

Still another object of the invention is to provide a model aircraft retractable landing gear device which is not bulky and which is installed with facility, convenience and rapidity in a flying model aircraft.

Yet another object of the invention is to provide a model aircraft retractable landing gear device of simple and inexpensive structure which operates reliably, efficiently and effectively.

Another object of the invention is to provide a model aircraft retractable landing gear device which may be used in a variety of ways as a landing gear motor actuator or device.

Still another object of the invention is to provide a model aircraft single cycle gear retractable landing gear device.

Yet another object of the invention is to provide a model aircraft retractable landing gear device which is fail safe, since if it is not activated to retract the landing gear such landing gear will stay down after take off.

Another object of the invention is to provide a model aircraft retractable landing gear device which includes a gravity gear extension.

BRIEF SUMMARY OF THE INVENTION

In accordance with the invention a model aircraft landing gear control device for a model aircraft having a fuselage and/or wing mounting said control device and a landing wheel, comprises a control member rotatably mounted on the fuselage in spaced relation with a supporting surface of the fuselage. A gear leg is supported at one end by the control member and supports a landing wheel at its spaced opposite end. The gear leg extends substantially radially of the control member. A torsion spring is coaxially mounted with the control member for storing energy when the control member is in a position whereby the gear leg is fully extended for ground operations and for releasing stored energy to rotate the control member in a manner whereby the gear leg is retracted for flying operations. A gear retracting initiator is coupled to the torsion spring for initiating gear retraction. An extend lock is provided for locking the gear leg in its fully extended position. A retract lock is provided for locking the gear leg in its retracted position. An actuator is provided in operative proximity with the extend lock and the retract lock for assisting in locking the gear leg in its fully extended position and for assisting in locking the gear leg in its retracted position.

The control member comprises a cylindrical unit having an axial length smaller than its radius. The control member has an upper surface, a spaced opposite lower surface and a side surface between them and is coaxially positioned on a pivot pin extending from the supporting surface. A torsion spring comprises a sleeve coaxially positioned on the pivot pin between the control member and the supporting surface and a disc on the supporting surface between the torsion spring and the supporting surface and coaxially positioned on the pivot pin. The torsion spring is coaxially wound on the sleeve and has an upper end protruding therefrom and a lower end protruding therefrom circumferentially spaced from the upper end, and affixed to the disc. A retract pin extends from the lower surface of the control member substantially parallel to and spaced from the pivot pin and is positioned so that the upper end of the torsion spring abuts the retract pin as the torsion spring releases stored energy by unwinding said torsion spring and rotates the control member via the retract pin in a clockwise direction thereby retracting the gear leg.

The gear retracting initiating means comprises a manual gear retraction cocking lever having a lower end affixed to the disc and a spaced opposite free upper end manually positionable to enable manual rotation of the disc and thereby the torsion spring in a direction whereby the torsion spring stores energy.

The extend locking means comprises a down lock plate affixed to the upper surface of the control member, a lock pin rotatably mounted substantially parallel to the pivot pin and adjacent the side surface of the control member, the lock pin having a half circular cross-section with a substantially flat surface extending lengthwise thereof, and the actuating means comprises an actuating lever extending substantially coplanar with the supporting surface and mounted on and rotatable with the lock pin whereby when the gear leg is fully extended the actuating lever is in a clockwise position and the substantially flat surface of the lock pin abuts the down lock plate thereby locking the gear leg in its fully extended position.

The retract locking means comprises an up lock plate affixed to the lower surface of the control member, a lock pin rotatably mounted substantially parallel to the pivot pin and adjacent the side surface of the control member, the lock pin having a half circular cross-section with a substantially flat surface extending lengthwise thereof, and the actuating means comprises an actuating lever extending substantially coplanar to the supporting surface whereby when the gear leg is retracted the actuating lever is in a counterclockwise position and the substantially flat surface of the lock pin abuts the up lock plate, thereby locking the gear leg in its retracted position.

The model aircraft landing gear control device of the invention further comprises retract locking release means for releasing the retract locking means and retract locking means and retract locking release means comprising radio signal receiving means for receiving control signals, amplifying means for amplifying received radio control signals and servomechanism means in operative proximity with the actuating lever for moving the actuating lever in a desired direction, the servomechanism means being electrically connected to the amplifying means thereby controlling rotation of said actuating lever in a manner whereby the substantially flat surface of the lock pin is selectively engaged with and disengaged from the up lock plate. The radio signal receiving means, amplifying means and servomechanism means also function as extend locking means and extend locking release means and move the actuating lever in a second desired direction thereby controlling rotation of the actuating lever in a manner whereby the substantially flat surface of the lock pin is selectively engaged with and disengaged from the down lock plate.

The model aircraft landing gear control device of the invention further comprises a gear leg up stop pin extending from the supporting surface in spaced substantially parallel relation with the pivot pin for preventing retraction of the gear leg beyond the gear leg up stop pin and whereby the retract locking means is moved into locking condition at the up stop position of the control member and a gear leg down stop pin extending from the supporting surface in spaced substantially parallel relation with the gear leg up stop pin and the pivot pin for preventing extending of the gear leg beyond the gear leg down stop pin and whereby the extend locking means is moved into locking condition at the down stop position of the control member.

The model aircraft landing gear control device of the invention further comprises a fore stop pin extending from the supporting surface in spaced substantially parallel relation with the pivot pin for preventing clockwise rotation of the actuating lever and whereby the extend locking means is moved into locking condition at the fore stop position of the actuating lever and an aft stop pin extending from the supporting surface in spaced substantially parallel relation with the pivot pin and the fore stop pin for preventing counterclockwise rotation of the actuating lever and whereby the retract locking means is moved into locking condition at the aft stop position of the actuating lever. The actuating lever releases the extend locking means when the actuating lever is rotated counterclockwise from the fore stop pin toward the aft stop pin and releases the retract locking means when the actuating lever is rotated clockwise from the aft stop pin toward the fore stop pin.

BRIEF DESCRIPTION OF THE DRAWINGS

In order that the invention may be readily carried into effect, it will now be described with reference to the accompanying drawings, wherein.

FIG. I is a top plan view of an embodiment of the model aircraft retractable landing gear device of the invention with the gear leg locked in extended position.

DETAILED DESCRIPTION OF PREFERRED EMBODIMENTS

Figure 1:
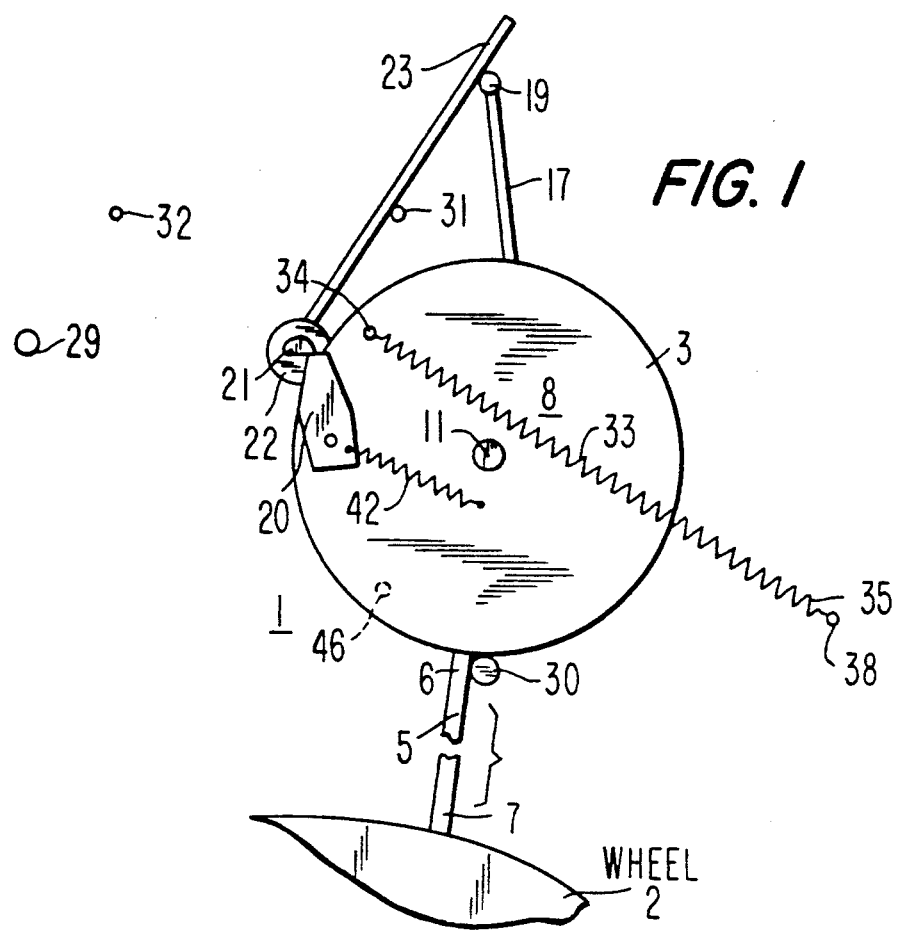

A flying model aircraft has a fuselage I (FIGS. 1, 2, 4, 5 and 7) and a landing wheel 2 (FIGS. I and 2). A control member 3 is rotatably mounted on the fuselage I (FIGS. 1, 2 and 7) or on a wing in spaced relation with a supporting surface 4 (FIG. 3) of said fuselage. A gear leg 5 is supported at one end 6 by the control member 3 (FIGS. I and 2) and supports the landing wheel 2 at its spaced opposite end 7 (FIGS. I and 2). The gear leg 5 extends substantially radially of the control member 3.

Figure 2:
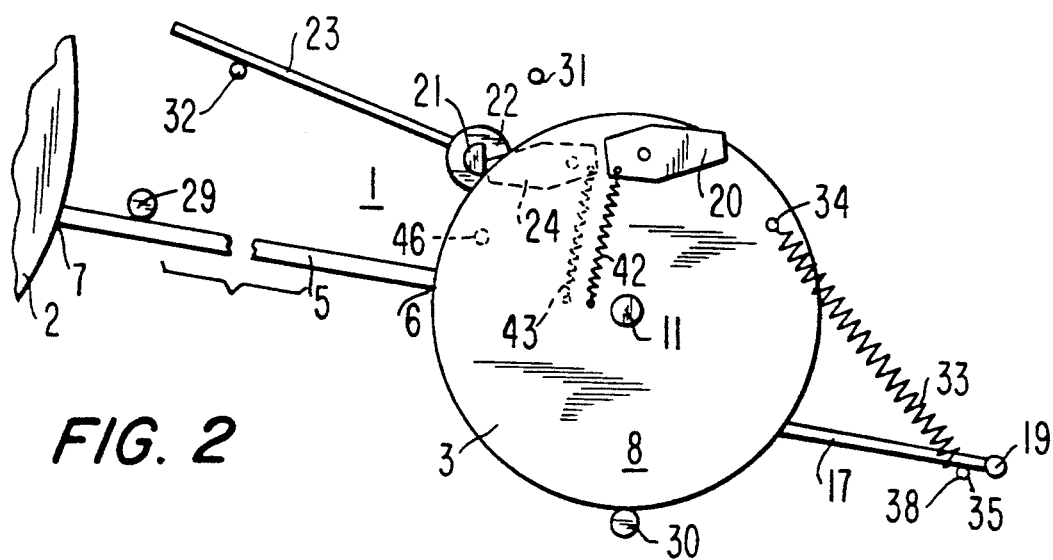
FIG. 2 is a top plan view of the embodiment of FIG. I with the gear leg locked in retracted position.
Figure 3:
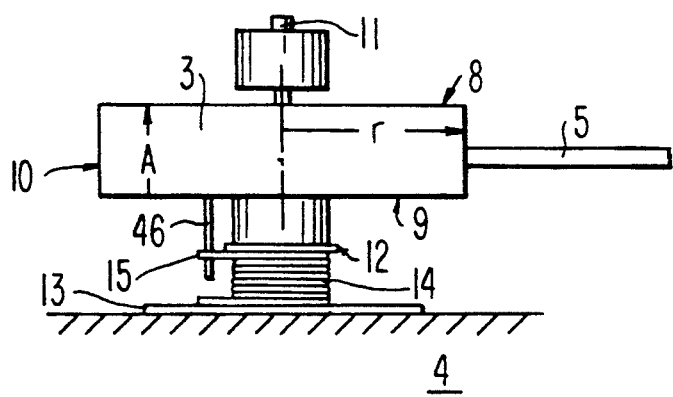
FIG. 3 is a side view of the control member and torsion spring means of FIGS. I and 2.
Figure 4:
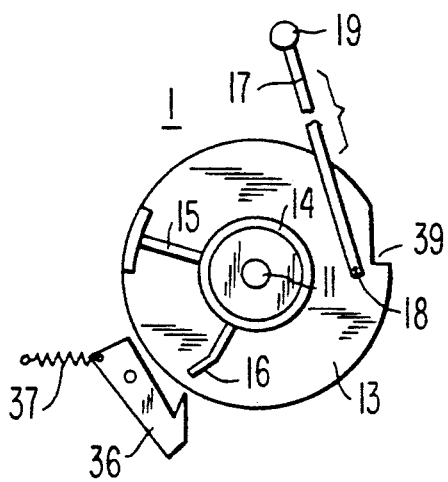
FIG. 4 is a top plan view of the disc and lock on pawl of the model aircraft retractable landing gear device of the invention in unlocked condition.

The control member 3 is preferably a cylindrical unit having an axial length A (FIG. 3) smaller than its radius r (FIG. 3). The control member 3 has an upper surface 8 (FIGS. 1, 2, 3 and 7), a spaced opposite lower surface 9 (FIG. 3) and a side surface 10 between them (FIG. 3) and is coaxially positioned on a pivot pin 11 extending from the supporting surface (FIGS. I to 3 and 7.

A torsion spring device is coaxially mounted with the control member 3 (FIG. 3) for storing energy when said control member is in a position whereby the gear leg 5 is fully extended for ground operations and for releasing stored energy to rotate said control member in a manner whereby said gear leg is retracted for flying operations. The torsion spring device comprises a sleeve 12 (FIGS. 3 and 6) coaxially positioned on the pivot pin 11 between the control member 3 and the supporting surface 4, as shown in FIG. 3, and a disc 13 (FIGS. 3 to 5) on said supporting surface between a torsion spring 14 (FIGS. 3 to 6) and said supporting surface (FIG. 3) and coaxially positioned on said pivot pin. The torsion spring 14 is coaxially wound on the sleeve 12 and has an upper end 15 (FIGS. 3 to 6) protruding therefrom and a lower end 16 (FIGS. 3 to 6) protruding therefrom circumferentially spaced from said upper end and affixed to the disc 13.

A retract pin 46 (FIG. 3) extends from the lower surface 9 of the control member 3 substantially parallel to and spaced from the pivot pin 11 and is positioned so that the upper end 15 of the torsion spring 14 abuts said retract pin as the torsion spring releases stored energy by unwinding said torsion spring and rotates said control member via said retract pin in a clockwise direction thereby retracting the gear leg 5.

A gear retracting initiator is coupled to the torsion spring 14 for initiating gear retraction. The gear retracting initiator comprises a manual gear retraction cocking lever 17 (FIGS. 1, 2, 4 and 5) having a lower end 18 affixed to the disc 13 (FIGS. 4 and 5) and a spaced opposite free upper end 19 (FIGS. 1, 2, 4 and 5) manually positionable to enable manual rotation of said disc and thereby said torsion spring in a direction whereby said torsion spring stores energy.

Figure 7:
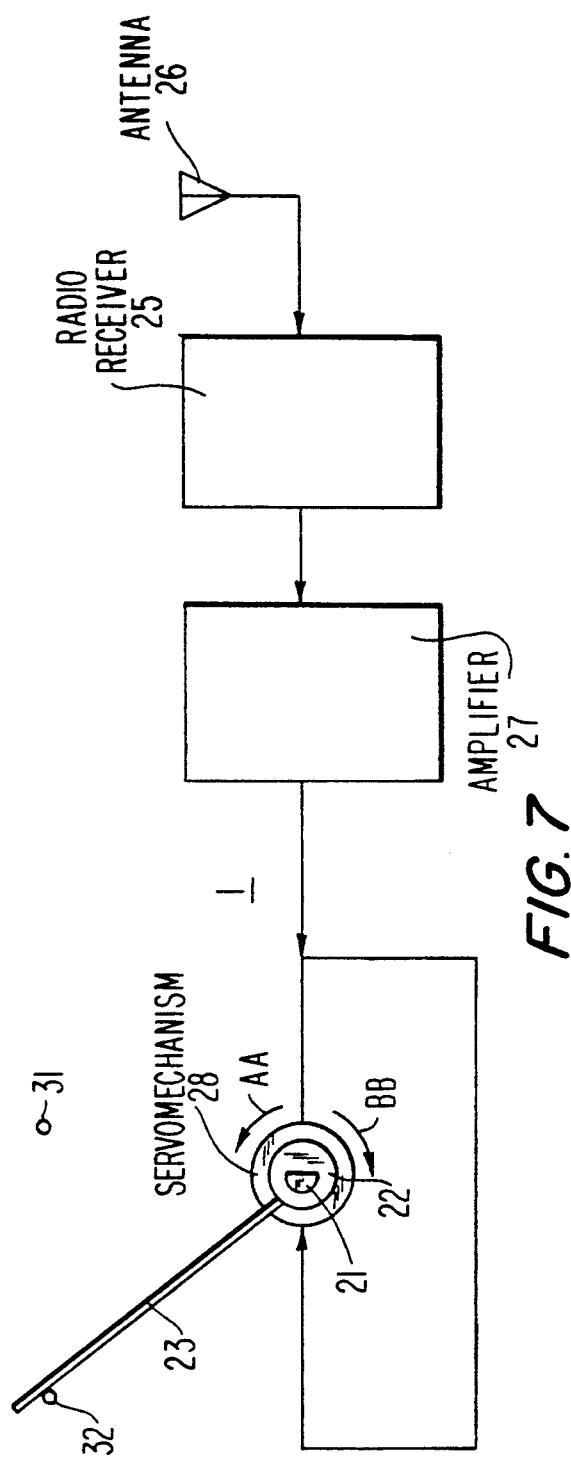
FIG. 7 is a schematic block diagram of an embodiment of the retract locking and locking release means and the extend locking and locking release means of FIGS. I and 2.

An extend lock is provided for locking the gear leg 5 in its fully extended position, as shown in FIG. 1, and a retract lock is provided for locking said gear leg in its retracted position, as shown in FIG. 2. The extend lock comprises a down lock plate 20 (FIGS. I and 2) affixed to the upper surface of the control member 3. A lock pin 21 is rotatably mounted on a rotary substantially cylindrical mount 22 substantially parallel to the pivot pin 11, coaxial with said rotary mount and adjacent the side surface 10 of the control member 3 (FIGS. 1, 2 and 7). The lock pin 21 has a half circular cross-section with a substantially flat surface extending lengthwise thereof, as shown in FIGS. 1, 2 and 7.

An actuator is provided in operative proximity with the extend lock and the retract lock and assists in locking the gear leg 5 in its fully extended position and in locking said gear leg in its retracted position. The actuator comprises an actuating lever 23 (FIGS. 1, 2 and 7) extending substantially coplanar with the supporting surface 4 and mounted on and rotatable with the lock pin 21 whereby when the gear leg 5 is fully extended said actuating lever is in a clockwise position and the substantially flat surface of said lock pin abuts the down lock plate 20 thereby locking said gear leg in its fully extended position, as shown in FIG. 1.

The retract lock comprises an up lock plate 24 (FIG. 2) affixed to the lower surface 9 of the control member 3, the lock pin 21 and the actuating lever 23. When the gear leg 5 is retracted the actuating lever 23 is in a counterclockwise position and the substantially flat surface of the lock pin 21 abuts the up lock 24 thereby locking said gear leg in its retracted position, as shown in FIG. 2.

The retract lock and retract lock release functions are accomplished by control signals transmitted via a short distance radio transmission system of any suitable type known in the art and which is light in weight, simple in structure and inexpensive in cost. The radio system, shown in FIG. 7, comprises a radio receiver 25 of any suitable known type for receiving control signals via an antenna 26. The radio control signals received by the receiver 25 are amplified by an amplifier 27 of any suitable known type. A servomechanism 28 of any suitable known type is positioned in operative proximity with the actuating lever 23 and is electrically connected to the amplifier 27 (FIG. 7). The servomechanism 28 moves the actuating lever 23 in a first desired direction AA (counterclockwise) (FIG. 7) thereby controlling rotation of said actuating lever in a manner whereby the substantially flat surface of the lock pin 21 is selectively engaged with or disengaged from the up lock plate 24.

The extend lock release functions are also accomplished by the radio system of FIG. 7. The servomechanism 28 moves the actuating lever 23 in a second desired direction BB (clockwise) thereby controlling rotation of said actuating lever in a manner whereby the substantially flat surface of the lock pin 21 is selectively engaged with or disengaged from the down lock plate 20. A suitable known type of servomechanism includes a servomotor which rotates 45 degrees in the AA direction and 45 degrees in the BB direction.

As shown in FIGS. I and 2, a gear leg up stop pin 29 extends from the supporting surface 4 in spaced substantially parallel relation with the pivot pin 11 for preventing retraction of the gear leg 5 beyond said gear leg up stop pin, as shown in FIG. 2, and whereby the retract lock is moved into locking condition (FIG. 2) at the up stop position of the control member 3. Also, as shown in FIGS. I and 2, a gear leg down stop pin 30 extends from the supporting surface 4 in spaced substantially parallel relation with the gear leg up stop pin 29 and the pivot pin 11 for preventing extending of the gear leg 5 beyond said gear leg down stop pin, as shown in FIG. 1, and whereby the extend lock is moved into locking condition (FIG. 1) at the down stop position of the control member 3.

As shown in FIGS. I and 2, a fore stop pin 31 extends from the supporting surface 4 in spaced substantially parallel relation with the pivot pin 11 for preventing clockwise rotation of the actuating lever 23 beyond a predetermined angle (FIG. 1) and whereby the extend lock is moved into locking condition at the fore stop position of said actuating lever, as shown in FIG. 1. Also, as shown in FIGS. I and 2, an aft stop pin 32 extends from the supporting surface 4 in spaced substantially parallel relation with the pivot pin 11 and the fore stop pin 31 for preventing counterclockwise rotation of the actuating lever 23 beyond a predetermined angle (FIG. 2) and whereby the retract lock is moved into locking condition at the aft stop position of said actuating lever, as shown in FIG. 2.

The actuating lever 23 releases the extend lock when said actuating lever is rotated counterclockwise from the fore stop pin 31 toward the aft stop pin 32 and releases the retract lock when said actuating lever is rotated clockwise from said aft stop pin toward said fore stop pin.

A gear raising tension spring 33 has one end 34 affixed to the control member 3 near the circumference thereof and its spaced opposite other end 35 affixed to the supporting surface 4 (FIGS. I and 2). When the extend lock is in lock condition, as shown in FIG. 1, and the gear leg 5 is fully extended and locked for ground operations, as shown in FIG. 1, the partial landing gear weight negator spring 33 is extended (FIG. 1). When the extend lock is released and there are no other impediments to rotation of the control member 3, the partial landing gear weight negator spring 33 constricts and rotates said control member clockwise thereby retracting the gear leg 5, as shown in FIG. 2. As the control member 3 rotates, raising the landing gear, the moment arm of the spring 33 becomes large. Thus, the rotating moment becomes large, so that the spring 33 tends to aid the torsion spring 14.

Figure 5:
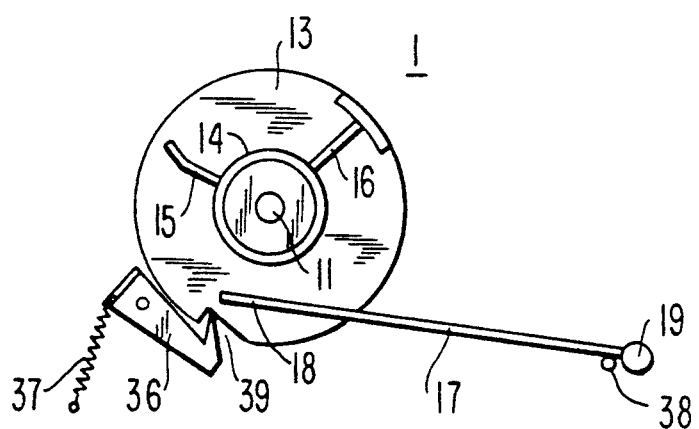
FIG. 5 is a top plan view of the disc and lock on pawl of FIG. 4 in locked condition.
Figure 6:
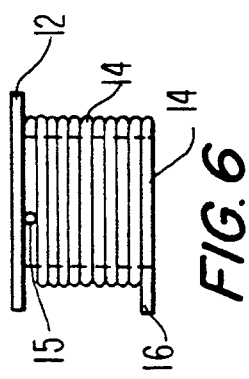
FIG. 6 is a side view, on an enlarged scale, of the torsion spring of FIG. 3.

A lock on pawl 36 is pivotally mounted on the supporting surface 4 (FIGS. 4 and 5) and biased by a tension spring 37 (FIGS. 4 and 5) to rotate counterclockwise, so that when the manual gear retraction cocking lever 17 is manually moved as far clockwise as it can, until it abuts a pin 38, as shown in FIGS. 2 and 5, said lock on pawl locks the disc 13 via its lock notch 39 (FIGS. 4 and 5) storing energy in the gear torsion spring 14, such that the spring force is transmitted to the control member 3. When the down lock plate 20 is released by counterclockwise movement of the actuating lever 23, the landing gear is driven up by the torsion spring 14, aided by the partial landing gear weight negator spring 33. Before engaging the aft stop pin 32, the flat face of the lock pin 21 is set at the proper angle to engage the up lock plate 24 which rides over said lock pin as the landing gear retracts clockwise. Since it is spring-backed, the up lock plate 24 can be radially depressed to ride over the lock pin 21. Similarly, the gear down lock plate 20 can ride over the lock pin 21, moving counterclockwise as the landing gear extends.

Just before the actuating lever 23 strikes the aft stop pin 32, the release member 40 strikes the pawl 36, releasing the torsion spring 14 stored energy. The control member 3 is then held up by the up lock plate 24. When the actuating lever 23 is moved clockwise by the servomechanism 28 to cause the landing gear to extend, the up lock plate 24 is released, permitting said landing gear to drop by gravity. This causes the control member 3 to rotate to its down and locked position. The partial landing gear weight negator spring 33 will not hold the landing gear up against the force of gravity without the torsion spring 14. The spring 33 functions to prevent the landing gear from slamming down too hard, as well as to assist the torsion spring 14 to lift said landing gear.

Figure 8:
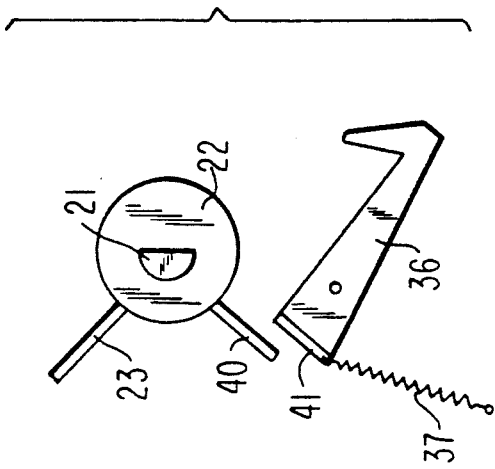
FIG. 8 is a top plan view, on an enlarged scale, of the lock on the pawl 36.

When the release member 40 abuts the end plate 41 of the lock on pawl 36, said pawl is rotated clockwise (FIGS. 5 and 8).

The down lock plate 20 is biased counterclockwise by a tension spring 42 (FIGS. I and 2). The up lock plate 24 is biased clockwise by a tension spring 43 in order to maintain the clarity of illustration.

The landing gear may be extended and retracted as hereinbefore illustrated. Thus, although the nose wheel is primarily extended and retracted in a vertical plane extending lengthwise through the fuselage of the aircraft, the main landing wheels may be extended and retracted in planes substantially parallel to said vertical plane by the landing gear device of the invention. Furthermore, the main landing wheels may be extended and retracted in vertical planes perpendicular to that in which he nose wheel is extended and retracted and may be retracted toward each other or away from each other. The main landing wheels may also be rotated about their axes 90° and then retracted in vertical planes perpendicular to that in which the nose wheel is extended and retracted and extended and rotated 90° to their initial alignments.

The servomechanism 28 may be remotely positioned relative to the landing gear and may drive a plurality of push-pull flex cables each coupled tot a corresponding one of the gear legs 5.

Although the invention has been shown and described in what is believed to be the most practical and preferred embodiment, it is apparent that departures from the specific method and designs described and shown will suggest themselves to those skilled in the art and may be made without departing from the spirit and scope of the invention, 1, therefore, do not wish to restrict myself to the particular construction described and illustrated, but desire to avail myself of all modifications that may fall within the scope of the appended claims.

I claim:

1. A model aircraft landing gear control device for a model aircraft having a fuselage mounting said control device and a landing wheel, said control device comprising a control member rotatably mounted on said fuselage in spaced relation with a supporting surface of said fuselage;

a gear leg supported at one end by said control member and supporting a landing wheel at its spaced opposite end, said gear leg extending substantially radially of said control member;

torsion spring means coaxially mounted with said control member for storing energy when said control member is in a position whereby said gear leg is fully extended for ground operations and for releasing stored energy to rotate said control member in a manner whereby said gear leg is retracted for flying operations;

gear retracting initiating means coupled to said torsion spring means for initiating gear retraction;

extend locking means for locking said gear leg in its fully extended position;

retract locking means for locking said gear leg in its retracted position; and actuating means in operative proximity with said extend locking means and said retract locking means for assisting in locking said gear leg in its fully extended position and for assisting in locking said gear leg in its retracted position.

2. A model aircraft landing gear control device as claimed in claim 1, wherein said control member comprises a cylindrical unit having an axial length smaller than its radius.

3. A model aircraft landing gear control device as claimed in claim 1, wherein said control member has an upper surface, a spaced opposite lower surface and a side surface between them and is coaxially positioned on a pivot pin extending from said supporting surface and said torsion spring means comprises a sleeve coaxially positioned on said pivot pin between said control member and said supporting surface, a disc on said supporting surface between a torsion spring and said supporting surface and coaxially positioned on said pivot pin, said torsion spring being coaxially wound on said sleeve and having an upper end protruding therefrom and a lower end protruding therefrom circumferentially spaced from said upper end and affixed to said disc and a retract pin extending from the lower surface of said control member substantially parallel to and spaced from said pivot pin and positioned so that said upper end of said torsion spring abuts said retract pin as said torsion spring releases stored energy by unwinding said torsion spring and rotates said control member via said retract pin in a clockwise direction thereby retracting said gear leg.

4. A model aircraft landing gear control device as claimed in claim 3, wherein said gear retracting initiating means comprises a manual gear retraction cocking lever having a lower end affixed to said disc and a spaced opposite free upper end manually positionable to enable manual rotation of said disc and thereby said torsion spring in a direction whereby said torsion spring stores energy.

5. A model aircraft landing gear control device as claimed in claim 3, wherein said extend locking means comprises a down lock plate affixed to the upper surface of said control member, a lock pin rotatably mounted substantially parallel to said pivot pin and adjacent the side surface of said control member, said lock pin having a half circular cross-section with a substantially flat surface extending lengthwise thereof, and said actuating means comprises an actuating lever extending substantially coplanar to said supporting surface and mounted on and rotatable with said lock pin whereby when said gear leg is fully extended said actuating lever is in a clockwise position and the substantially flat surface of said lock pin abuts said down lock plate thereby locking said gear leg in its fully extended position.

6. A model aircraft landing gear control device as claimed in claim 3, wherein said retract locking means comprises an up lock plate affixed to the lower surface of said control member, a lock pin rotatably mounted substantially parallel to said pivot pin and adjacent the side surface of said control member, said lock pin having a half circular cross-section with a substantially flat surface extending lengthwise thereof, and said actuating means comprises an actuating lever extending substantially coplanar to said supporting surface whereby when said gear leg is retracted said actuating lever is in a counterclockwise position and the substantially flat surface of said lock pin abuts said up lock plate thereby locking said gear leg in its retracted position.

7. A model aircraft landing gear control device as claimed in claim 1, further comprising retract locking release means for releasing said retract locking means.

8. A model aircraft landing gear control device as claimed in claim 6, further comprising retract locking means and retract locking release means and extend locking means and extend locking release means comprising radio signal receiving means for receiving control signals, amplifying means for amplifying received radio control signals and servomechanism means in operative proximity with said actuating lever for moving said actuating lever in first and second desired directions, said servomechanism means being electrically connected to said amplifying means thereby controlling rotation of said actuating lever in a manner whereby said substantially flat surface of said lock phi is selectively engaged with and disengaged from said up lock plate when said actuating lever is moved in said first direction and said substantially flat surface of said lock pin is selectively engaged with and disengaged from said down lock plate.

9. A model aircraft landing gear control device as claimed in claim 6, further comprising a gear leg up stop pin extending from said supporting surface in spaced substantially parallel relation with said pivot pin for preventing retraction of said gear leg beyond said gear leg up stop pin and whereby said retract locking means is moved into locking condition at the up stop position of said control member and a gear leg down stop pin extending from said supporting surface in spaced substantially parallel relation with said gear leg up stop pin and said pivot pin for preventing extending of said gear leg beyond said gear leg down stop pin and whereby said extend locking means is moved into locking condition at the down stop position of said control member.

10. A model aircraft landing gear control device as claimed in claim 6, further comprising a fore stop pin extending from said supporting surface in spaced substantially parallel relation with said pivot pin for preventing clockwise rotation of said actuating lever and whereby said extend locking means is moved into locking condition at the fore stop position of said actuating lever and an aft stop pin extending from said supporting surface in spaced substantially parallel relation with said pivot pin and said fore stop pin for preventing counterclockwise rotation of said actuating lever and whereby said retract locking means is moved into locking condition at the aft stop position of said actuating lever, said actuating lever releasing said extend locking means when said actuating lever is rotated counterclockwise from said fore stop pin toward said aft stop pin and releasing said retract locking means when said actuating lever is rotated clockwise from said aft stop pin toward said fore stop pin.

* * * * *